United States Patent [19]

Barer et al.

[11] Patent Number: 4,460,641
[45] Date of Patent: Jul. 17, 1984

[54] MICROPOROUS HOLLOW FIBERS AS PROTECTANTS AGAINST TOXIC AGENTS

[75] Inventors: Sol J. Barer, Fanwood; Michael M. Besso, West Orange, both of N.J.

[73] Assignee: Celanese Corporation, New York, N.Y.

[21] Appl. No.: 476,944

[22] Filed: Mar. 21, 1983

[51] Int. Cl.$^3$ ............................................... B32B 7/00
[52] U.S. Cl. ..................................... 428/246; 428/252; 428/253; 428/284; 428/286; 428/300; 428/365; 428/376; 428/398
[58] Field of Search ............... 428/246, 283, 284, 286, 428/365, 372, 376, 398

[56] References Cited

U.S. PATENT DOCUMENTS 3,755,064  8/1973  Maierson ............................. 428/372
3,900,656  8/1975  Schmidt .............................. 428/398
4,302,509  11/1981 Coplan et al. ....................... 428/372

OTHER PUBLICATIONS

IBM Tech. Disclosure Bulletin, vol. 15, No. 9, Feb. 1973, "Water Soluble Cored Solder" Girard.

Primary Examiner—James J. Bell
Attorney, Agent, or Firm—Burns, Doane, Swecker & Mathis

[57] ABSTRACT

The present invention provides a protective garment fabric material for enhanced personal protection against harmful substances present in the ambient atmosphere. This fabric is manufactured from microporous hollow fibers containing neutralization agents capable of detoxifying chemical or biological agents in the lumina of the fibers. The protective fabrics of the present invention possess enhanced mechanical strength, high efficiency, and at the same time provide a larger concentration of detoxicant per surface area than the protective fabrics of the prior art.

5 Claims, No Drawings

MICROPOROUS HOLLOW FIBERS AS PROTECTANTS AGAINST TOXIC AGENTS

BACKGROUND OF THE INVENTION

In the manufacture or use of toxic chemical or biological agents, it is of paramount importance to protect personnel present in the ambient environment. In addition to the peacetime use of such chemical agents, the prospect of chemical and biological warfare creates a critical need to equip personnel in the field with highly efficient protection against sophisticated chemical and biological warfare agents. (For example, personal protection must obtain an efficiency of over 99.97% to be acceptable against certain biological agents.) The present invention provides a protective garment fabric material comprising microporous hollow fibers, the lumina of which are filled with at least one counteragent capable of neutralizing chemical or biological agents.

Microporous hollow fibers are themselves well known in the art. See, for example, U.S. Pat. Nos. 4,020,230, 4,055,696, and 4,290,987, and Japanese Laid-Open Patent Application No. 137026/77, the contents of which are hereby incorporated by reference. Particularly preferred microporous hollow fibers are described in commonly assigned U.S. patent application Ser. No. 349,795, filed Feb. 18, 1982, now U.S. Pat. No. 4,405,688 "Microporous Hollow Fiber and Process and Apparatus for Preparing Such Fibers" by James L. Lowery et al., the content of which is herein incorporated by reference. Other microporous fibers are described in commonly assigned U.S. patent application Ser. No. 11,740, filed Feb. 13, 1979 in the name of Davis et al.

It is also known that the lumina of hollow fiber membranes may be filled with various chemicals such as pesticides and pheronomes for agricultural purposes or activated carbon for use in hemodialysis. See, Klein, *Journal of Applied Polymer Science: Applied Polymer Symposium*, 31, pp. 361-381 (1977). U.S. Pat. No. 3,875,008 similarly discloses a hollow fiber bioreactor wherein the fiber lumen is filled with activated carbon. As shown by U.S. Pat. No. 3,557,962, hollow fiber membranes have also been manufactured in fabric form for use, e.g., in reverse osmosis.

Heretofore, the prior art has provided protection against toxic chemical agents by methods such as sorption, either by carbon-impregnated fabrics (see, e.g., U.S. Pat. No. 2,984,584) or by carbon-treated resin foams (see, e.g., U.S. Pat. No. 4,045,609), and chemical deactivation, either by chloroamide-treated fabrics (see, e.g., U.S. Pat. No. 2,968,675) or by microencapsulated deactivators incorporated within resin finishes (see, U.S. Pat. No. 4,201,822).

The sorptive carbon utilized in the prior art protective garments does not neutralize toxic agents but merely sorbs them. Therefore, such garments present substantial desorption problems. Furthermore, conventional chemical protective garments in which activated carbon is the sorptive material suffer from degradation due to the action of sweat and sebum. The organic substituents of sweat (e.g., urea and salts of lactic acid) are adsorbed by the activated carbon, thereby reducing its ability to sorb toxic chemical agents. While this problem has been addressed with respect to protective garments consisting of, inter alia, a resin foam within which activated carbon is dispersed (see, e.g., U.S. Pat. No. 4,153,745), carbon-treated resin foams are easily ignited and the resulting flame is difficult to extinguish. U.S. Pat. No. 4,190,696 adds a flame retardant to such foam materials, but the activity of the sorptive material is thereby inherently decreased, while the protective garment still suffers from the disadvantages intrinsic to the use of resin foams, such as a lack of mechanical strength. Also, for carbon-impregnated fabrics to provide adequate protection, the fabric must be impregnated with such large amounts of carbon that much of the inherent flexibility and air permeability of the fabric is lost.

The chloroamide-treated fabrics utilized in the prior art to deactivate toxic agents also suffer from certain disadvantages which have limited their practical use. These fabrics liberate hypochlorite in the presence of moisture. This causes a potentially debilitating skin irritation in some allergic individuals. Also, protective garments treated with chloroamides gradually lose their ability to deactivate toxic chemical agents and therefore must be periodically retreated.

While fabrics containing microencapsules of deactivating reagents bound to the fabric surface by a resin finish, such as those of U.S. Pat. No. 4,201,822, provide some limited personal protection against toxic agents, there are limitations on the available detoxicants which can be successfully microencapsulated. As can be seen from U.S. Pat. No. 4,201,822 the detoxicants are conventionally microencapsulated by either the phase separation or the interfacial polymerization techniques. Phase separation microencapsulation is suitable for use only with detoxification agents that are insoluble or slightly soluble in both hot and cold cyclohexane. Interfacial polymerization microencapsulation is limited to those detoxicants that do not react with the microencapsulating material and thus reduce the activity of the detoxicant. The number of detoxicant agents which can be employed in this type of protective fabric is thus quite limited. In addition, for encapsulation to be effective, one must carefully control the relevant process parameters. Even with such control, the yield of microcapsules is only about 15-50% and is made even lower by the lengthy process requried for binding the microcapsules to the fabric.

Limited personal protection can also be provided by chromium-complex impregnated microporous polyurethane. This material has been found to be inflammable and easily torn. (See, *A Survey of Chemical and Biological Warfare,* Cookson and Nottingham (1969) at pages 325-326).

As can be seen from the foregoing description of the prior art, the prior art protective fabrics are thus of only limited usefulness and suffer from a number of disadvantages. Accordingly, it would be desirable to provide an improved protective garment fabric material which provides enhanced protection against toxic chemical or biological agents.

SUMMARY OF THE INVENTION

It is an object of the present invention therefore to provide a garment fabric material which provides enhanced personal protection against chemical and biological agents.

It is also an object of the present invention to provide personal protection against harmful substances in the ambient atmosphere through a microporous hollow fiber fabric whose lumina are filled with at least one neutralizing agent capable of neutralizing these harmful substances.

In accordance with the present invention, these and other objects are achieved through the provision of a chemically protective fabric material comprising at least one layer of a fabric of microporous hollow fibers of a non-reactive, relatively inert polymeric material, having the lumina thereof filled with at least one neutralizing agent capable of neutralizing chemical or biological agents. Chemically protective fabrics in accordance with this invention may consist solely of the aforementioned microporous hollow fiber fabric. Alternatively, the neutralizing agent-containing microporous hollow fiber fabric may be combined with layers of other materials such as barrier films or natural or synthetic fabrics or cloths to produce composite fabrics.

In contrast to the prior art personal protection fabrics and garments made therefrom, the protective garment fabric provided by the present invention is mechanically strong, lightweight, and adaptable to a wide range of detoxicants. The mechanical strength, very large surface to volume ratio, and low grams per square meter weight of fabricated microporous hollow fibers make such a fabric a superior vehicle for neutralizing agents for toxic chemical or biological agents and, therefore, provide enhanced personal protection against chemical or biological agents over the protective fabrics of the prior art. Most importantly, since in the protective fabrics of the instant invention the counteragent is contained in the lumina of the microporous hollow fibers, both solid and liquid counteragents may be employed at higher concentrations than with the conventional impregnated fabrics of the prior art. Moreover, due to the highly porous character of the microporous hollow fibers and the large surface area thereof, efficient gas/vapor contact of the toxic agent and the neutralizing agent may be obtained. In addition, as a result of the unique fabric form of the neutralizing agent-containing porous materials of the instant invention, the subject protective materials possess improved mechanical strength as compared with the impregnated porous foams and films which have heretofore been suggested by the prior art.

DETAILED DESCRIPTION OF THE PREFERRED EMBODIMENTS

As described above, a key element of the instant protective materials is the presence of at least one layer of a fabric formed from microporous hollow fibers having their lumina filled with at least one neutralizing agent capable of neutralizing chemical or biological agents. As used herein, the term "fabric" is employed in a generic sense and refers to any of the various textile constructions well known to those skilled in the art which may be prepared by interlacing microporous hollow fibers (either by themselves or in the form of yarns, etc.) in the form of planar configurations, including woven fabrics, non-woven fabrics, knitted fabrics, needled fabrics, felted fabrics, sewn fabrics, quilted fabrics or other well known constructions. Similarly, the term "cloth" is used in a generic sense, referring to any of the above-described or other well-known textile fiber constructions, and is used interchangeably with the term "fabric."

Microporous hollow fibers suitable for use in the instant fabrics may comprise any of the microporous hollow fibers well known to those skilled in the art which are relatively inert and non-reactive with the particular neutralizing agent with which the hollow fiber is to be filled. Microporous hollow fibers which possess such properties typically include the fibers prepared from polymers such as the polyolefins, for example, polyethylene, polypropylene, etc.; the polyamides, e.g., polyhexamethylene adipamide (nylon 66), polycaprolactam etc.; polyesters such as polyethylene terephthalate; polyoxymethylene polymers and copolymers; polyvinylchloride and polyvinylidene chloride; polytetrafluoroethylene; polybenzimidazoles; polysulfones, polyacrylonitrile and copolymers thereof; and polyisobutylene oxide, as well as various other chemically inert polymers and copolymers such as are well known to those skilled in the art. The specific type of polymer selected is dictated by the choice of the neutralizing agent which is to be employed. Where the neutralizing agent is very active chemically, such as for example neutralizing agents which are strong oxidizing agents, a highly chemically resistant polymer is required for the microporous hollow fibers, such as for example polypropylene or polytetrafluoroethylene. On the other hand, where the neutralizing agent is not very active chemically, such as those neutralizing agents which function by sorption, a wide range of polymeric materials may be employed in the microporous hollow fibers including such chemically sensitive materials as cellulose acetate and regenerated cellulose.

Desirably, the microporous hollow fibers are also resistant to sweat and sebum. Many neutralizing agents are adversely affected by contact with sweat and sebum. The sorptive capacity of charcoal, for example, is significantly reduced by contact with sweat and sebum. Similarly, another common neutralizing agent, the chloroamides, liberate hypochlorite in the presence of moisture with a concomitant loss in efficiency of the protective material.

Where the neutralization agent is a hydrophilic liquid, the microporous hollow fiber is selected to comprise a hydrophobic polymer in order to prevent neutralization agent leakage therefrom. Similarly, where the neutralization agent is a hydrophobic liquid, the microporous hollow fiber is selected to comprise a hydrophilic polymer.

In addition, the chemical and physical characteristics of the microporous hollow fibers must enable the fiber to be permeable to the chemical or biological agents but substantially impermeable to the detoxifying neutralization agent.

The microporous hollow fibers employed herein will typically also have an average inner diameter of from about 20 to about 1500 microns, with microporous hollow fibers having inner diameters of from about 25 to about 1200 microns, and most preferably from about 50 to about 500 microns being particularly preferred due to the ability of such fibers to contain desirable amounts of neutralization agent.

Suitable microporous hollow fibers for use herein in addition possess an average wall thickness of from about 5 to about 75 microns, preferably from about 15 to about 50 microns, and most preferably from about 15 to about 30 microns.

The microporous hollow fibers utilized in this invention are also characterized by being highly permeable, having an average effective pore size of from about 50 to about 5000 Angstroms, preferably from about 100 to about 1000 Angstroms and most preferably from about 200 to about 800 Angstroms; a porosity of from about 40 to about 90 percent, preferably from about 50 to about 90 percent, and most preferably from about 60 to about 80 percent; and an air permeability of less than 20 Gurley seconds and preferably less than about 10 Gurley seconds.

As indicated above, the permeability of the microporous hollow fibers used herein is measured by the Gurley test, i.e., according to ASTM D 726. This test is conducted by assembling the microporous hollow fibers in a test module which is adapted to fit a Gurley densometer. One end of the hollow fiber module is sealed off so that all of the air displaced from the Gurley instrument passes through the pores of the hollow fibers. The fibers are subjected to a standard differential pressure of 12.2 inches of water. The time in seconds required to pass 10 cm$^3$ of air through the hollow fibers is expressed in seconds. This time value is then adjusted, using the transfer area, i.e., internal hollow fiber surface area of the hollow fiber assembly, to convert the time value to second/in$^2$ of transfer area. The resulting adjusted time values are referred to as Gurley seconds. Thus, a Gurley value, as reported herein, is the time in seconds it takes to pass 10 cm$^3$ of air through 1 in$^2$ of hollow fiber internal surface area at a pressure of 12.2 inches of water.

The porosity of the microporous hollow fibers, for the purposes of the present invention, is defined as a percent ratio of the total volume occupied by the void space of a standard sample of microporous hollow fiber to the bulk volume of the same sample which is the sum of the void space volume and the volume occupied by the solid material of the fiber itself. The percent porosity is determined by calculating the bulk volume of a microporous fiber sample and then determining the density of the fiber from its weight and the calculated bulk volume. The density of the polymer resin used to prepare the hollow fiber is then determined. The percent porosity is then calculated from the equation:

$$\% \text{ Porosity} = 1 - \frac{\text{density of fiber sample}}{\text{density of resin}} \times 100$$

Pore size may be measured by mercury porosimetry, as described in an article by R. G. Quynn, on pages 21–34 of Textile Research Journal, January, 1963. Alternatively, an electron micrograph of the fibers can be taken and pore length and width measurements are obtained by using an image analyzer or ruler to directly measure the length and width of the pores thereof, usually at 5,000 to 12,000 magnification and scaling down to appropriate size. Generally, the pore length values obtainable by electron microscopy are approximately equal to the pore size values obtained by mercury porosimetry.

Other desirable features of the microporous hollow fibers employed in the protective fabrics of this invention include a breaking elongation (ASTM D123-70) of not less than about 20% and preferably not less than about 50%, and a tensile strength (ASTM D123-70) of greater than about 1500 psi, preferably greater than about 2000 psi and most preferably greater than about 2500 psi.

Microporous hollow fibers having the foregoing characteristics are ideally suited for use in chemically protective fabrics, since they have a combination of size, neutralization agent, capacity, mechanical strength, weight, and permeability which renders protective fabrics of the same far superior to the conventional porous type protective fabrics of the prior art.

Microporous hollow fibers suitable for use in this invention are per se known in the art and may be prepared by any of the various techniques known to those skilled in the art. Such techniques include, for example, the various techniques described in U.S. Pat. Nos. 4,290,987; 4,055,696; 4,020,230; 3,455,460; 3,423,491; British Pat. No. 1,506,665; and Scott, *Hollow Fibers, Manufacture and Applications,* Chemical Technology Review No. 194 (Noyes Data Corporation, 1981), the entirety of which are herein incorporated by reference.

Due to their high resistance to sweat and sebum and chemical inertness, particularly preferred microporous hollow fibers for use in the invention protective fabrics comprise olefin polymers. Illustrative examples of suitable polyolefins include polyethylene, polypropylene, poly-3-methyl butene-1, poly-4-methyl pentene-1, copolymers of ethylene, propylene, 3-methyl butene-1, or 4-methyl pentene-1 with each other or with minor amounts of other olefins, e.g., copolymers of ethylene and propylene, copolymers of a major amount of 3-methyl butene-1 and a minor amount of a straight chain n-alkene having from 2 to 18 carbon atoms such as n-octene-1, n-hexadecene-1, n-octadecene-1 or other relatively long chain alkenes, as well as copolymers of 3-methyl pentene-1 and any of the same n-alkenes mentioned previously in connection with 3-methyl butene-1. The polyolefinic material may also include small amounts (e.g., less than about 20% by weight) of other materials which may be copolymerized or blended therewith, but which do not substantially adversely affect the characteristics of the polyolefinic material. A particularly preferred polyolefin is isotactic polypropylene having a weight average molecular weight in the range of from about 50,000 to about 600,000, preferably from about 100,000 to about 600,000; and a melt index in the range of from about 0.6 to about 35, preferably from about 0.6 to about 15, and most preferably from about 0.6 to about 8 (e.g., from about 1 to 5).

Also particularly preferred is high density polyethylene having a density greater than 0.960; a weight average molecular weight of from 50,000 to 600,000, preferably from about 100,000 to about 600,000; and a melt index of from about 0.5 to about 15, preferably from about 0.6 to about 8 and most preferably from about 0.6 to 5.

Highly advantageous polyolefinic microporous hollow fibers are available commercially, for example, from Celanese Fibers Manufacturing Company, Charlotte, N.C. under the tradename Celgard ®. Especially preferred polyolefinic microporous hollow fibers are also described in commonly assigned U.S. patent application Ser. No. 349,795, filed Feb. 2, 1982, in the name of James Lowery et al, the entirety of which is herein incorporated by reference and relied on in its entirety. Among various other characteristics and advantages, the microporous polyolefinic hollow fibers described therein possess outstanding uniformity of porosity and structural characteristics such as wall thickness, and may be prepared with inner diameters as large as 1500 microns and with wall thicknesses of up to 75 microns.

The polyolefinic microporous hollow fibers of U.S. patent application Ser. No. 349,795 are prepared by a procedure which broadly may be summarized as comprising the steps of melt spinning non-porous hollow precursor fibers in a substantially vertically upward direction at a temperature of from about 10° to about 90° C. above the crystalline melting point of the polymer and then spin orienting the precursor fibers while subjecting the precursor to a symmetrical quenching step using a hollow annular structure surrounding the precursor which has one or more openings on its inner surface that distribute the quenching medium against the precursor in a substantially uniform manner. Following the spin orienting and quenching of the precursor, the hollow non-porous precursor fiber is converted into a microporous hollow fiber by stretching and heat setting the fiber. Preferably, the precursor fiber is also annealed prior to stretching.

It has been found that polyolefinic microporous hollow fibers produced by this method exhibit a greater and more uniform molecular orientation and porosity, a more uniformly round shape and a more uniform wall thickness. As a result of this unique combination of characteristics, such polyolefinic microporous hollow fibers exhibit not only higher permeabilities than the typical microporous hollow fibers of the prior art but in addition are mechanically stronger and more durable than the prior art fibers, characteristics of obvious advantage to the subject invention.

A further advantage of upward extrusion is the ability to spin larger hollow fibers. Using the down-spinning technique conventional in the prior art, the internal diameter of the hollow-fiber is practically limited to a maximum of 300 microns with a 25 micron wall thickness using common fiber grade polyolefinic resins. Using upward extrusion, fibers with inner diameters as large as 1500 microns and 75 microns wall thickness may be spun with adequate orientation for conversion to the microporous state. In addition, a wider flexibility of resin choice is possible with the upspinning/symmetrical quench technique, both low melt index and high melt index resins being capable of use therein with equal advantage. This result is particularly surprising since with the downspinning technique of the prior art higher melt index resins are preferred due to their smaller die swell characteristics. The ability to utilize higher molecular weight (lower melt index) resins is an attractive advantage since they can be fabricated into a mechanically stronger fiber. The molecular weight of the resin can also be used to control the pore size of the fiber to the desired value.

Further details concerning the polyolefinic microporous hollow fibers preferred for use in the protective fabrics of this invention, as well as their method of preparation, may be obtained by referring to Ser. No. 349,795.

The protective fabrics of this invention are formed by first filling the microporous hollow fibers with one or more neutralization agents and then fabricating the filled microporous hollow fibers into a fabric by conventional textile techniques such as are well-known to those skilled in the art. The microporous hollow fibers may be filled with the neutralization agent, for example, by suction, using either liquid neutralization agents, or slurries, suspensions or dispersions of solid neutralization agents. Solid neutralization agents may also be deposited within the lumina of the microporous hollow fibers by co-extrusion techniques wherein a slurry or dispersion of the solid neutralization agent is co-extruded simultaneous with the polymer during fiber spinning. In this regard, see, e.g., U.S. Pat. No. 3,875,008, the contents of which are herein incorporated by reference. Other techniques which may be employed include precipitation techniques wherein the neutralization agent is precipitated from a solution thereof fed into the fiber lumina, electrochemical techniques wherein metal neutralization agents are electrochemically reduced from a solution thereof onto the internal lumen walls of the microporous hollow fibers, or any other procedure which may be obvious to those skilled in the art. The specific technique employed for filling the microporous hollow fibers is not particularly critical to the present invention provided that the technique chosen is sufficient to provide a protective amount of the neutralization agent within the microporous hollow fibers. Preferably, the filled microporous hollow fibers will contain at least about 5% by weight, more preferably at least about 20% by weight, and most preferably from about 20 to about 40% by weight of the neutralization agent, based on the total weight of hollow fibers and neutralization agent.

The neutralization agent may comprise any suitable neutralization agent known to those skilled in the art, and may be either liquid or solid in form, and may function by either chemical action or sorption of the toxic agent. Examples of neutralization agents which function by chemical action include the chloramides; strong base combinations such as lithium hydroxide in monoethanolamine and sodium hydroxide and diethylenetriamine in methyl cellulose; sodium and calcium hypochlorite; hydroxamic acids; oximes; phenols; metal complexes such as chromium complexes; $CrO_3$; $KMnO_4$, $Na_2S_2O_3$; amines such as piperazine, ethanolamine and alkaline aqueous amino acid solutions; various carboxylic acids; sulfonic acid; Ag-anthranilic acid; sodium bicarbonate in kerosene/$H_2O$ emulsion; glycerol; various n-chloro compounds; isocyanuric chlorides; ethylenediamine; N,N-dichlorodimethyl hydantoin, sym-bis(N-2,4,6-trichlorophenyl) urea, as well as any of the various counteragents known to deactivate the toxic H, G and V chemical warfare agents. Due to its ability to deactivate a wide variety of toxic agents, including the H, G and V chemical warfare agents, XXCC3 agent, a solid neutralization agent consisting of 90% sym-bis(N-chloro-2,4,6-trichlorophenyl) urea and 10% ZnO, is a preferred neutralization agent for use in the protective fabrics of this invention. In order to provide protection against more than one type of chemical agent, mixtures of neutralization agents may be employed.

A preferred neutralization agent which functions by sorption is activated charcoal. Other sorptive materials such as pulverulent molecular sieves may also be employed, however.

Following filling of the microporous hollow fibers with the neutralization agent, the ends thereof are preferably sealed by thermal, sonic or adhesive means in order to prevent loss of the neutralization agent from the hollow fiber.

The filled microporous hollow fibers are then formed into a suitable fabric structure by, e.g., air forming, weaving, knitting, needling, or any of the various other textile techniques known to those skilled in the art. In order to provide a protective barrier to the toxic agent, it is preferred that the filled microporous hollow fiber fabric have a tight construction such that the toxic agents cannot freely migrate through the microporous hollow fiber fabric but must contact and be neutralized by the neutralization agent filled microporous hollow fibers. In other words, the filled microporous hollow fiber fabric should have a high density of filled microporous hollow fibers per unit area. Microporous hollow fiber fabrics having such a tight, high microporous hollow fiber density construction typically exhibit a fabric weight of about 30 to about 680 grams per square meter, based on the total weight of microporous hollow fiber and neutralization agent. Within the aforementioned range, fabrics having a weight of from about 135 to about 350 grams per square meter are particularly preferred since fabrics having such weights provide a desirable protective barrier to the toxic agents without an unduly heavy weight such as has characterized the protective fabrics of the prior art.

The above-described protective fabric may either be used as is or may be employed in various composite materials. The microporous hollow fiber protective fabric of this invention, for example, may be adhered by conventional methods to layers of impermeable barrier layers such as, for example, fluoroethylenepropylene films or layers of vinylidene fluoride/hexafluoropropene elastomers, or to various backing materials such as natural and synthetic cloths, fabrics, permeable polymer films or other conventional stock materials. Where desired, the protective fabric, either in single layer or composite form with layers of other materials, may also be treated with suitable water repellant and/or flame resistant compositions such as are well known to those skilled in the art. A particularly preferred composite material in accordance with this invention comprises a laminate of the microporous hollow fiber protective fabric sandwiched between a layer of a barrier film and a layer of natural or synthetic cloth or fabric.

The invention is additionally illustrated in connection with the following Examples where are to be considered as illustrative of the present invention. It should be understood, however, that the invention is not limited to the specific details of the Examples.

EXAMPLE I

A chemically protective fabric, containing XXCC3 neutralization agent (a solid neutralization agent consisting of 90% sym-bis-(N-chloro-2,4,6-trichlorophenyl) urea and 10% ZnO) is prepared from commercially available Celgard microporous polypropylene hollow fibers (Celanese Fibers Marketing Company, Charlotte, N.C.). The microporous polypropylene hollow fibers employed in this fabric possess an inner diameter of 400 microns, a wall thickness of 25–30 microns, an effective pore size of approximately 200 Angstroms, a porosity of 80% and a Gurley value of less than 20 seconds.

The microporous hollow fibers are filled with the XXCC3 neutralization agent by potting the ends of the fibers in epoxy and then drawing a slurry of the XXCC3 agent in acetone, into the lumen of the fibers by suction. In their filled state, the microporous hollow fibers comprise 20–40% by weight of the XXCC3 agent.

The filled microporous hollow fibers are then separated from the epoxy potting and the ends thereof simultaneously sealed by cutting the fiber ends above the epoxy potting with a hot knife. The resulting free, filled microporous hollow fibers are then formed into a nonwoven web having a weight of from about 135 to 350 grams per square meter, by air laying.

EXAMPLE 2

The chemically protective non-woven web of Example 1 is formed into a composite protective material by sandwiching the web between a one mil thick fluoroethylenepropylene barrier layer and a woven polyester cloth of ordinary garment weight using a conventional thermal bonding technique.

Although the invention has been described with preferred embodiments, it is to be understood that variations and modifications may be employed as will be apparent to those skilled in the art. Such variations and modifications are to be considered within the scope of the claims appended hereto.

What is claimed is:

1. A chemically protective fabric material comprising at least one layer of a fabric of microporous hollow fibers comprising a relatively inert synthetic hydrophobic polymer and having an average inner diameter of from about 20 to about 1500 microns, an average wall thickness of from about 5 to about 75 microns, an average effective pore size of from about 50 to about 5000 Angstroms, a porosity of from about 40 to about 90%, and an air permeability of less than about 20 Gurley seconds, said microporous hollow fibers further having the lumina thereof filled with at least one neutralizing agent capable of neutralizing toxic chemical or biological agents.

2. The chemically protective fabric material of claim 1 wherein said fabric comprises:
   a. at least one layer of said filled microporous hollow fiber fabric; and
   b. at least one layer of a backing material selected from the group consisting of impermeable barrier films, natural and synthetic cloths and fabrics and mixtures thereof adhered to at least one surface of said microporous hollow fiber fabric.

3. The chemically protective fabric material of claim 1, wherein said fabric comprises at least one layer of said filled microporous hollow fiber fabric interposed between a layer of an impermeable barrier film adhered to one face of said microporous hollow fiber fabric and a layer of a natural or synthetic cloth or fabric adhered to the other face of said microporous hollow fiber fabric.

4. The chemically protective fabric material of claim 1, wherein said microporous hollow fibers comprise polypropylene microporous hollow fibers having an average effective pore size of from about 100 to about 1000 Angstroms; a porosity of from about 50 to 90%; an average inner diameter of from about 50 to 500 microns; an average wall thickness of from about 15 to 50 microns; and an air permeability of less than about 10 Gurley seconds.

5. The chemically protective fabric material of claim 1, wherein said microporous hollow fiber fabric has a fabric weight of from about 135 to about 350 grams per square meter, based on total weight, and the microporous hollow fibers employed therein contain from about 20 to about 40% by weight of said neutralizing agent.

* * * * *